United States Patent [19]

Tanabe et al.

[11] Patent Number: 4,656,021

[45] Date of Patent: Apr. 7, 1987

[54] METHOD FOR THE PRODUCTION OF SILICON

[75] Inventors: Yasuo Tanabe, Tokyo; Minoru Tamura, Kasukabe, both of Japan

[73] Assignee: Mitsubishi Chemical Industries, Ltd., Tokyo, Japan

[21] Appl. No.: 854,525

[22] Filed: Apr. 22, 1986

[30] Foreign Application Priority Data

Jun. 17, 1985 [JP]  Japan .................................. 60-131578

[51] Int. Cl.⁴ ............................................ C01B 33/02
[52] U.S. Cl. ................................... 423/350; 423/348; 423/349
[58] Field of Search ................................ 423/350, 349

[56] References Cited

FOREIGN PATENT DOCUMENTS 0032318  4/1981  Japan .................................. 423/349
0887463  12/1981  U.S.S.R. ............................. 423/349

Primary Examiner—John Doll
Assistant Examiner—Lori S. Freeman
Attorney, Agent, or Firm—Oblon, Fisher, Spivak, McClelland & Maier

[57] ABSTRACT

A method for producing silicon which comprises subjecting silane and chlorine to a combustion reaction to generate a flame and thereby precipitating fine crystals of silicon.

5 Claims, 1 Drawing Figure

METHOD FOR THE PRODUCTION OF SILICON

BACKGROUND OF THE INVENTION

1. Field of the Invention

The present invention relates to a method for producing silicon. More particularly, it relates to a method for producing silicon, whereby silicon can be produced at a very low cost and at a high production rate as compared with conventional methods.

2. Description of the Prior Art

Heretofore, the so-called Siemens method has been known for the production of silicon, wherein a slender silicon rod is disposed in a bell-shaped container, the interior of the container is flushed with pure hydrogen, and trichlorosilane diluted with $H_2$ is supplied while maintaining the rod at a temperature of from 1050° to 1150° C. by an application of electricity, whereby silicon is precipitated and formed on the surface of the slender silicon rod at a high temperature. This method has an excellent feature that it is thereby possible to produce highly pure silicon with a purity of at least 99.999999%. However, this method had the drawbacks that not only is the growing speed of silicon is slow, but also a great amount of electric power (from 100 to 200 kwh to obtain 1 kg of the product) is required, whereby the production cost is very high. Accordingly, it would be desirable to develop a method for producing silicon having a high purity without consuming electric power.

As one of the methods for producing silicon without using any electric power, a method has recently been proposed which comprises introducing hydrogen and chlorine gas into a reactor, burning them to generate a flame, blowing silane or a halogenated silane into the flame to let it undergo thermal decomposition and precipitating silicon on a seed material which is rotated (Japanese Examined Patent Publication No. 17843/1982). According to this method, it is necessary to generate a flame by means of chlorine and hydrogen.

SUMMARY OF THE INVENTION

It is an object of the present invention to provide a method for producing highly pure silicon at a low production cost at a high rate for the formation of silicon without consumption of electric power.

The present inventors have conducted various researches to accomplish such an object, and as a result have found unexpectedly that it is possible to generate a flame by means of chlorine and silane only, and it is possible to precipitate fine crystals of silicon without generating a flame by means of chlorine and hydrogen as in the case of the above-mentioned prior art. The present invention has been accomplished based on this discovery.

Namely, the present invention provides a method for producing silicon which comprises subjecting silane and chlorine to a combustion reaction to generate a flame and thereby precipitating fine crystals of silicon.

According to the method of the present invention, the rate of formation of silicon is very high as compared with the conventional method wherein electric power is used, and it is possible to produce a silicon polycrystal having a large size readily and at a low cost. Further, as compared with the method wherein silicon starting material is thermally decomposed by a flame generated by the combustion reaction of hydrogen and chlorine, the method of the present invention is advantageous in that since no hydrogen is used, the production cost can further be reduced, and there is no possibility that impurities contained in the hydrogen will be included in the final product. The method of the present invention has a further advantage that silicon having a high purity can readily be prepared.

The highly pure silicon obtained by the present invention is useful as a substrate for semiconductor integrated cicuits after being processed into single crystals or cut into thin plates and being subjected to polishing.

DETAILED DESCRIPTION OF THE INVENTION

Now, the method of the present invention will be described in detail.

In the present invention, silane and chlorine, which may be preheated as the case requires, are burned as represented by the following formula (1).

$$SiH_4 + 2Cl_2 \rightarrow Si + 4HCl + 95.5 \text{ Kcal} \tag{1}$$

By this exothermic reaction, a flame with a temperature of at least 1000° C., preferably at least 1200° C., is generated, whereby fine crystals of silicon are formed and precipitated.

The combustion reaction of chlorine and silane of the present invention is conducted in an inert gas atmosphere to prevent oxidation of the precipitated fine crystals of silicon. For this purpose, basically any inert gas may be employed so long as it is capable of preventing oxidation of fine crystals of silicon. For instance, a rare gas such as argon, helium or neon, or hydrochloride gas may be employed. In a preferred embodiment, a rare gas such as argon is filled in a reactor, and then silane and chlorine are introduced into the reactor and subjected to the combustion reaction. The rare gas such as argon may continuously or intermittently supplied into the reactor during the combustion reaction. However, since hydrochloride gas is generated by the combustion reaction as shown by the formula (1), it is convenient that once the combustion reaction has started, the reaction is conducted in a hydrochloride atmosphere.

The silane to be used in the present invention is preferably of a high purity. In order to obtain a highly pure product such as a product having a purity of at least 99.999999%, it is advisable to purify the silane to such an extent that it contains not higher than 1 ppm, preferably not higher than 0.5 ppm, most preferably not higher than 0.1 ppm, by volume, as calculated as a hydride, of each of P, B, Sb and As as impurities, before use. The purification can be conducted most advantageously by distillation.

However, the silane as the starting material may contain a small amount of hydrogen as an impurity, i.e. a small amount of hydrogen of a level of not higher than 4% by volume which is per se insufficient to bring about the combustion reaction with chlorine, because such hydrogen as an impurity can be burned with chlorine together with the silane.

The chlorine to be used in the present invention is preferably of a high purity. Chlorine may be purified prior to the use, depending upon the desired purity of the product. As in the case of the silane, impurities, particularly oxygen and nitrogen, reduce the purity of the product. For instance, in order to obtain a product having such a high purity, it is desirable that the chlorine is purified to such an extent that the content of each of hydrogen and nitrogen is not higher than 1 ppm by volume, preferably not higher than 0.1 ppm by volume. The purification can be conducted most advantageously by cooling and/or pressurizing chlorine to a liquid state, followed by distillation.

Figure 1:
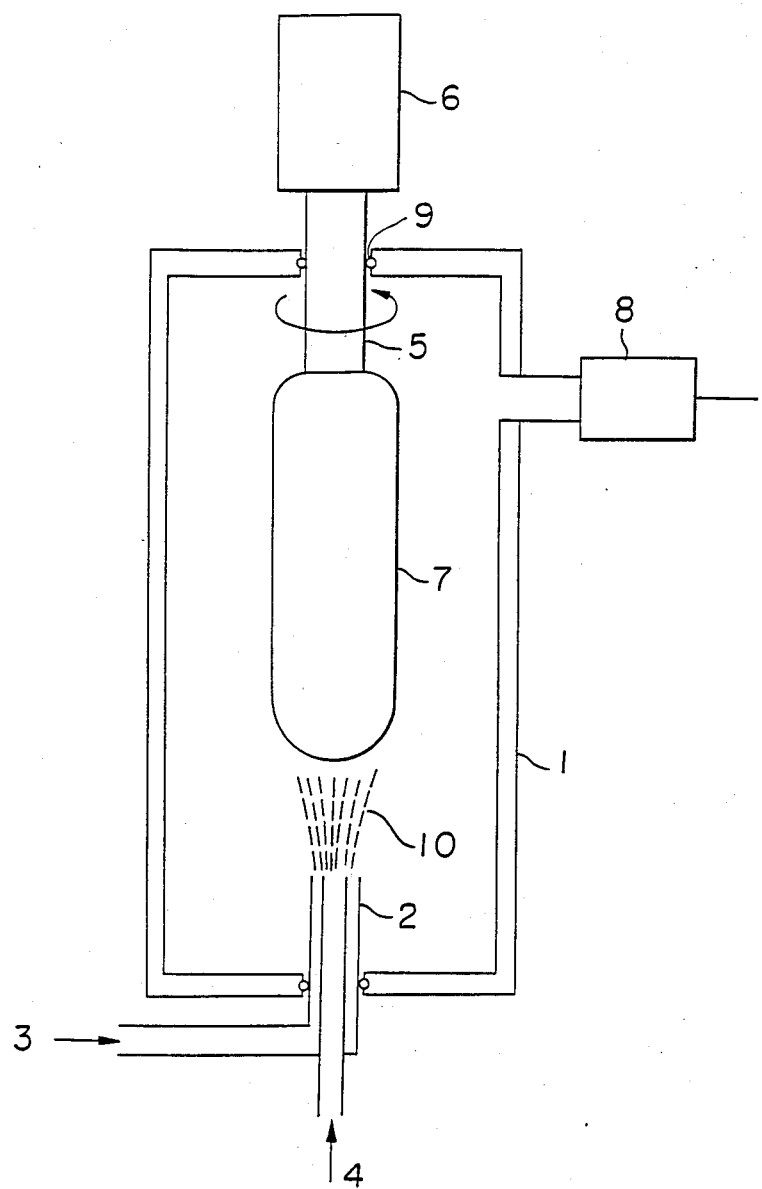
FIG. 1 is a cross sectional view of an apparatus useful for conducting the method of the present invention.

In the present invention, silane and chlorine are burned in a reactor as mentioned above. The combustion is preferably conducted by using a burner made of metallic silicon or silicon carbide. For instance, in order to obtain metallic silicon having a purity of at least 99.999999%, it is advisable to use a burner of metallic silicon having a similar purity. For the structure of the burner, various types may be employed so long as they are suitable for generating a flame by the combustion reaction of silane and chlorine. For instance, as shown in FIG. 1, the burner may have a double wall tubular structure, or silane and chlorine may be supplied by separate burners respectively.

The silane is supplied to the burner preferably in an amount smaller than the stoichiometric amount represented by the formula (1) relative to the chlorine to be supplied. Silane is not only expensive, but, if used in excess, will burn upon contact with air when unreacted silane is taken out from the reaction system. Further, the silane and chlorine may be preheated prior to the combustion reaction, as the case requires. It is preferred to preheat them to a temperature of at least 250° C., more preferably at least 350° C. However, with respect to the silane, it is undesirable to preheat it to a temperature of 600° C. or higher, because at such a high temperature, the silane is likely to undergo decomposition during the preheating, thus leading to clogging of the supply pipe or burner. The chlorine may be heated to a temperature of 600° C. or higher.

The reactor is preferably partially or entirely made of metallic silicon or silicon carbide. In the case of metallic silicon, metallic silicon per se has low heat resistance and mechanical strength and expensive, and therefore it is most preferred to use graphite with its inner surface covered with silicon. Further, the reactor is subjected to high temperatures, and it may be a reactor equipped with a jacket.

In the method for the production of silicon according to the present invention, fine crystals of silicon are precipitated by the reaction of the formula (1) as mentioned above. In this invention, it is possible to let the precipitated fine crystals deposit and accumulate on a seed material which moves upwardly while being rotated.

In such a method wherein fine crystals of silicon are precipitated and deposited on the forward end of the seed material, it is possible to readily obtain a silicon rod having a circular cross section by properly adjusting the rotational speed and the rate for the upward movement of the seed material.

As the seed material, a silicon polycrystal or $SiO_2$ may usually be employed. However, in order to obtain silicon having a high purity, it is advisable to employ a polycrystal having a high purity. As another method, a method may be mentioned wherein fine crystals of silicon are precipitated and deposited on a rotating highly pure silicon seed material having a plate-like or rod-like shape, and the formed silicon polycrystal is melted by the flame and permitted to drop and cooled to form a particulate silicon polycrystal.

Now, an example for carrying out the method of the present invention for the production of silicon will be described. FIG. 1 is a cross-sectional view of an apparatus for conducting the method of the present invention. In the Figure, reference numeral 1 designates a reactor, numeral 2 a burner, numeral 3 a silane supply pipe, numeral 4 a chlorine supply pipe, numeral 5 a seed material, numeral 6 a device for rotating and upwardly withdrawing the seed material, numeral 7 a silicon polycrystal, numeral 8 an exhaust gas controlling device, numeral 9 a sealing material, and numeral 10 a flame generated by the combustion of silane and chlorine. This apparatus is basically the same as the apparatus disclosed in Japanese Examined Patent Publication No. 17843/1982 except that no hydrogen supply pipe is provided. As shown in FIG. 1, at the bottom of this reactor 1, a burner 2 is provided. The burner 2 is connected with the starting material supply pipe 3 and the chlorine gas supply pipe 4. Above this burner, the device 6 for rotating and upwardly withdrawing a seed material 5, is provided. The precipitated silicon polycrystal is grown at the forward end of the seed material 5. The reactor 1 is provided further with an exhaust gas controlling device 8 which is designed to discharge HCl formed by the reaction and at the same time, to adjust the pressure in the reactor 1. A sealing material 9 is provided at the location of the burner 2 and at the entrance for the seed material 5 to maintain the interior of the reactor 1 in an air-tight condition. At the burner 2, the introduced silane and chlorine undergo combustion as represented by the formula (1).

$$SiH_4 + 2Cl_2 \rightarrow Si + 4HCl + 95.5 \text{ Kcal} \qquad (1)$$

By this exothermic reaction, a flame is generated, and fine crystals of silicon are formed. The stream of fine silicon crystals, (i.e. the silane-chlorine flame) 10 adheres and deposits on the forward end of the seed material 5 connected to the device 6 for rotating the seed material, whereby a polycrystal 7 of silicon is formed. The polycrystal 7 of silicon is rotated and upwardly withdrawn by the device 6 in correspondence with the growth, whereby a rod-like silicon polycrystal 7 having a circular cross section is produced.

According to the present invention, by using silane as the silane starting material, it is possible to readily prepare silicon of a high purity by burning it only with chlorine without generating a flame by means of chlorine and hydrogen. The method of the present invention is advantageous over the method wherein silane is thermally decomposed by generating a flame by means of chlorine and hydrogen, in that the production cost can further be reduced, and it is possible to obtain a product having a higher purity since there is no possibility that impurities contained in the hydrogen are included in the silicon product.

Now, the present invention will be described in further detail. However, it should be understood that the present invention is by no means restricted by these specific Examples.

EXAMPLE 1

A silicon polycrystal was prepared in the following manner by using the apparatus as shown in FIG. 1.

After flushing the interior of the reactor with argon, 10 liter/min NTP of silane and 22 liter/min NTP of chlorine both preheated to 500° C. were supplied to a burner 2 via a supply pipe 3 and a supply pipe 4, to generate a silane-chlorine flame, whereby a polycrystal of silicon was prepared.

A silicon polycrystal 7 having a diameter of 100 mm was formed with a growing rate of about 40 mm/hr. The purity of the silicon thus obtained, was at least 99.999999%.

The starting material chlorine was the one obtained by distillation and contained not higher than 0.1 ppm by volume of each of water ($H_2O$) and nitrogen ($N_2$) as impurities.

Likewise, the starting material silane was the one obtained by distillation and contained not higher than 0.1 ppm by volume of P, B, Sb and As (each calculated as the hydride).

COMPARATIVE EXAMPLE 1

A silicon polycrystal was prepared by using the same apparatus as shown in FIG. 1 except that the burner was changed to the one having a three wall tubular structure.

After flushing the interior of the reactor with argon, 22 liter/min NTP of hydrogen and 22 liter/min NTP of chlorine were supplied to the reactor via the largest diameter supply tube and the intermediate diameter supply tube of the burner, and the hydrogen and the chlorine were burned to generate a flame. Then, silane was introduced into the flame via the smallest diameter supply tube of the burner at a rate of 10 liter/min NTP, whereby a polycrystal of silicon was prepared.

A silicon polycrystal having a diameter of about 100 mm was formed at a growing rate of about 40 min/hr. The purity of the silicon thus obtained was 99.9999%.

The chlorine and silane were the same as used in Example 1. The hydrogen used was electrolytic hydrogen having a purity of 99.99% by weight (containing $N_2$, $CO_2$, CO, $H_2O$ and S as impurities).

The lower purity of the silicon polycrystal than the purity of the product of Example 1 is believed to be attributable to the impurities contained in the electrolytic hydrogen used.

EXAMPLE 2

A silicon polycrystal was prepared in the same manner as in Example 1 except that the silane and the chlorine were not preheated, the supply rate of the silane was changed to 25 liter/min NTP and the supply rate of chlorine was changed to 50 liter/min NTP.

A silicon polycrystal having a diameter of 110 mm was formed at a growing rate of about 30 mm/hr. The purity of the silicon polycrystal was 99.999999%.

What is claimed is:

1. A method for producing silicon which consists of combusting a mixture consisting essentially of silane, containing up to 4% by volume of hydrogen, and chlorine in an inert gas atmosphere to generate a flame, thereby precipitating crystals of silicon.

2. The method according to claim 1, wherein the crystals of silicon are precipitated on a seed material held above the flame.

3. A method according to claim 1, wherein the silane or chlorine or mixture thereof is preheated to a temperature of at least 250° C. prior to the combustion reaction.

4. The method according to claim 1, wherein the silane contains P, B, Sb and As as impurities each in an amount of not more than 1 ppm by volume as calculated as a hydride.

5. The method according to claim 1, wherein the chlorine contains $H_2O$ and $N_2$ as impurities each in an amount of not more than 1 ppm by volume.

* * * * *